(12) United States Patent
Fujii et al.

(10) Patent No.: US 9,908,806 B2
(45) Date of Patent: Mar. 6, 2018

(54) SHEET GLASS, METHOD FOR MANUFACTURING SHEET GLASS, AND DEVICE FOR MANUFACTURING SHEET GLASS

(71) Applicant: Nippon Electric Glass Co., Ltd., Shiga (JP)

(72) Inventors: Takahide Fujii, Shiga (JP); Masao Tsukada, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 241 days.

(21) Appl. No.: 14/415,002

(22) PCT Filed: Jul. 25, 2013

(86) PCT No.: PCT/JP2013/070151
§ 371 (c)(1),
(2) Date: Jan. 15, 2015

(87) PCT Pub. No.: WO2014/017577
PCT Pub. Date: Jan. 30, 2014

(65) Prior Publication Data
US 2015/0210585 A1    Jul. 30, 2015

(30) Foreign Application Priority Data

Jul. 27, 2012    (JP) ................................. 2012-167172

(51) Int. Cl.
*C03B 33/10* (2006.01)
*C03B 33/023* (2006.01)
(Continued)

(52) U.S. Cl.
CPC ............ *C03B 33/105* (2013.01); *B28D 1/225* (2013.01); *C03B 33/023* (2013.01);
(Continued)

(58) Field of Classification Search
CPC . C03B 33/105; C03B 33/0207; C03B 33/023; C03B 33/04; C03B 33/09;
(Continued)

(56) References Cited

U.S. PATENT DOCUMENTS

| 3,178,085 A * | 4/1965 | Jochim ................... C03B 33/04 225/104 |
| 2004/0182903 A1 * | 9/2004 | Marek ..................... C03B 33/03 225/2 |

(Continued)

FOREIGN PATENT DOCUMENTS

| CN | 101910075 | 12/2010 |
| CN | 102194626 | 9/2011 |

(Continued)

OTHER PUBLICATIONS

Chinese Office Action dated Dec. 4, 2015 in corresponding Chinese Patent Application No. 201380006148.X with English translation.
(Continued)

*Primary Examiner* — Omar Flores Sanchez
(74) *Attorney, Agent, or Firm* — Wenderoth, Lind & Ponack, L.L.P.

(57) ABSTRACT

A method of manufacturing a glass sheet involves forming a scribe in one surface of a glass sheet having a rectangular shape on a periphery of an edge portion of the glass sheet in parallel to the edge portion, and cutting the glass sheet along the scribe as a boundary. The method includes forming the scribe in a region other than both end portions of the glass sheet in a direction along the edge portion; and cutting the glass sheet along a bending portion in which the glass sheet is locally bent, the bending portion being continuously formed in a state of being connected to the scribe and gradually protruding from an edge portion side to an inner side as being shifted away from the scribe.

6 Claims, 7 Drawing Sheets

(51) Int. Cl.
- *B28D 1/22* (2006.01)
- *C03B 33/033* (2006.01)
- *C03B 33/02* (2006.01)
- *C03B 33/04* (2006.01)
- *C03B 33/09* (2006.01)

(52) U.S. Cl.
CPC ........ *C03B 33/0207* (2013.01); *C03B 33/033* (2013.01); *C03B 33/04* (2013.01); *C03B 33/09* (2013.01); *Y02P 40/57* (2015.11); *Y10T 83/0333* (2015.04); *Y10T 83/0341* (2015.04)

(58) Field of Classification Search
CPC . B28D 1/225; Y10T 83/0333; Y10T 83/0341; Y02P 40/57
USPC .......................................................... 225/2
See application file for complete search history.

(56) References Cited

U.S. PATENT DOCUMENTS

| | | | | |
|---|---|---|---|---|
| 2013/0037592 | A1* | 2/2013 | Cavallaro, III | C03B 33/0207 225/2 |
| 2015/0183678 | A1* | 7/2015 | Park | B23K 26/38 225/2 |

FOREIGN PATENT DOCUMENTS

| | | |
|---|---|---|
| CN | 102442765 | 5/2012 |
| JP | 4-240130 | 8/1992 |
| JP | 7-25633 | 1/1995 |
| JP | 7-68395 | 3/1995 |
| JP | 9-85734 | 3/1997 |
| JP | 2007-126322 | 5/2007 |
| JP | 2008-266046 | 11/2008 |
| JP | 2009-83079 | 4/2009 |
| JP | 2014-024720 | 2/2014 |

OTHER PUBLICATIONS

Office Action dated Jul. 12, 2016 in corresponding Taiwanese Application No. 102126717, with partial English translation.
Office Action dated Jun. 21, 2016 in corresponding Japanese Patent Application No. 2013-533798 (English translation).
International Search Report dated Oct. 15, 2013 in International (PCT) Application No. PCT/JP2013/070151.
Written Opinion of the International Searching Authority dated Oct. 15, 2013 in International (PCT) Application No. PCT/JP2013/070151.

* cited by examiner

SHEET GLASS, METHOD FOR MANUFACTURING SHEET GLASS, AND DEVICE FOR MANUFACTURING SHEET GLASS

TECHNICAL FIELD

The present invention relates to a glass sheet, a method of manufacturing a glass sheet, which involves cutting the glass sheet along a scribe formed in the glass sheet as a boundary, and to an apparatus for manufacturing a glass sheet.

BACKGROUND ART

As is well known, in a process of manufacturing glass sheet products to be used for flat panel displays such as a liquid crystal display, a plasma display, and an electroluminescence display, a small-area glass sheet is cut out of a large-area glass sheet, and an edge portion extending along each side of the glass sheet is trimmed off. As a method therefor, a method of cleaving a glass sheet is taken as an example.

As one method of cleaving a glass sheet, there is publicly known a cleaving method that involves cutting as disclosed in JP 07-25633 A. In this method, a scribe is formed in the glass sheet, and then a cutting member is used to press a region on the periphery of the scribe. Thus, a bending moment is applied to the region in the vicinity of the scribe, and a tensile stress generated in the glass sheet due to the bending moment is utilized to propagate a median crack, which is derived from the scribe, in a direction from a scribe surface side of the glass sheet (surface in which the scribe is formed) to another surface side thereof. In this manner, the glass sheet is cleaved.

Technical Problems

By the way, the glass sheet cut by this method has a sharp shape with an angulated corner portion of the glass sheet. This causes the following problems to be solved.

That is, when the glass sheet in the course of manufacturing is to be moved in the same step or between the steps, there is widely carried out an operation of placing the glass sheet on a conveyor or the like to convey the glass sheet along a predetermined conveyance path. At this time, the sharp corner portion may be brought into contact with a jig or the like that is arranged on the periphery of the conveyance path, resulting in a defect and damage in the corner portion. This leads to such a situation that the yield of the final product of the glass sheet to be manufactured is deteriorated.

Further, in order to prevent a flaw and a crack from being generated in the front and back surfaces of the glass sheet, the glass sheet may be conveyed under a state in which the glass sheet is placed on a protective sheet. When a glass sheet having a sharp corner portion is to be conveyed, however, the corner portion may stick into or snag on the protective sheet, resulting in such a problem that the protective sheet is damaged.

SUMMARY OF INVENTION

The present invention has been made in view of the above-mentioned circumstances, and it is therefore a technical object thereof to prevent, when manufacturing a glass sheet, a defect and damage in a corner portion of the glass sheet and avoid such a situation that the corner portion sticks into or snags on a protective sheet.

Solution to Problems

According to one embodiment of the present invention, which is devised to solve the above-mentioned problems, there is provided a method of manufacturing a glass sheet, which involves forming a scribe in one surface of a mother glass sheet having a rectangular shape on a periphery of an edge portion of the mother glass sheet in parallel to the edge portion, and cutting the mother glass sheet along the scribe as a boundary, the method comprising: forming the scribe in a region other than both end portions of the mother glass sheet in a direction along the edge portion; and cutting the mother glass sheet so that a maximum stress is generated at a corner portion of the mother glass sheet in a region on an inner side of an imaginary extension straight line connected to the scribe.

When the mother glass sheet is to be cut, a cleaved portion of the mother glass sheet is propagated from a starting point corresponding to a low-strength region of the mother glass sheet along a region having generated therein a stress higher than that in a region on the periphery thereof. Therefore, at the corner portion of the mother glass sheet, the cleaved portion is propagated from a starting point corresponding to the end portion of the scribe in a direction along the edge portion of the mother glass sheet so as to pass through the region having the maximum stress generated therein, which is positioned on the inner side of the imaginary extension straight line connected to the scribe. As a result, the corner portion of the mother glass sheet after the cutting is carried out has a convexly curved shape. Thus, it is possible to prevent such a situation that, when the glass sheet in the course of manufacturing is to be conveyed in the same step or between the steps, a defect and damage are generated in the corner portion due to contact with a jig or the like that is arranged on the periphery of a conveyance path. Further, it is possible to avoid such a situation that, when the glass sheet is placed on a protective sheet, the corner portion sticks into or snags on the protective sheet.

In the above-mentioned method, it is preferred that a cutting member for cutting the mother glass sheet comprise a pressing portion extending in the direction along the edge portion and configured to press the one surface of the mother glass sheet, the pressing portion comprising protruding portions, which gradually protrude from the edge portion side of the mother glass sheet to an inner side as being shifted toward a distal end side thereof, the protruding portions being formed at both distal end portions of the pressing portion in the direction along the edge portion, and that the method further comprise pressing a region on the edge portion side with respect to the scribe by the pressing portion of the cutting member.

When the mother glass sheet is to be pressed by the cutting member, a bending portion, in which the mother glass sheet is bent locally, is formed in the mother glass sheet by a bending moment. At the corner portion of the mother glass sheet, the bending portion conforms to the shape of the protruding portion of the cutting member for pressing the corner portion, and gradually protrudes from the edge portion side of the mother glass sheet to the inner side as being shifted toward the distal end side in the direction along the edge portion. Further, the bending portion is continuously formed in a state of being connected to the scribe. At this time, a tensile stress higher than that in a region on the periphery of the bending portion is applied to the bending portion, and the maximum stress is generated in this bending portion. Therefore, at the corner portion, the mother glass sheet is not cut along the scribe, but is cut along the bending portion connected to the scribe. As a result, the corner portion can be formed into the convexly curved shape.

In the above-mentioned method, it is preferred that the method further comprise: covering the scribe with a covering member over an entire length of the scribe so as to form a flow space of water vapor; causing the water vapor to flow into the flow space from one end side of the flow space in a direction along the scribe; and collecting glass chippings, which are generated through the cutting, by the water vapor flowing out of the flow space from another end side of the flow space in the direction along the scribe. The "water vapor" herein refers to not only a gas containing the water vapor alone, but also a gas mixture containing the water vapor and air (the same applies hereinafter).

With this configuration, when the water vapor is caused to flow into the flow space formed by the covering member, the region on the periphery of the scribe covered with the covering member is brought into a humidified state as compared to a case where air is caused to flow simply. It is found that, under the humidified state, the pressing force necessary to cut the mother glass sheet may be smaller. In addition, the amount of glass chippings that may be generated at the cleaved portion at the time of cutting the mother glass sheet depends on the magnitude of the pressing force, and as the pressing force is larger, a larger amount of the glass chippings are generated. Therefore, it is possible to reduce the amount of the glass chippings that may be generated at the cleaved portion of the mother glass sheet at the time of cutting the mother glass sheet. Further, the water vapor is caused to flow in a direction from the one end side to the another end side of the flow space in the direction along the scribe. Thus, it is possible to collect the glass chippings generated at the cleaved portion by bearing the glass chippings in a direction from the inside to the outside of the flow space without flying the glass chippings. As a result, it is possible to appropriately collect the glass chippings without causing the glass chippings to adhere onto the mother glass sheet.

In the above-mentioned method, it is preferred that the pressing portion of the cutting member comprise an inclined portion gradually spaced away from the one surface of the mother glass sheet as being shifted from one end side to another end side of the pressing portion in the direction along the edge portion, and that the method further comprise sequentially pressing, in a direction from the one end side to the another end side, the region on the edge portion side with respect to the scribe by the pressing portion of the cutting member.

With this configuration, when the pressing force is to be applied to the mother glass sheet, the mother glass sheet is sequentially pressed by the cutting member in the direction from the one end side to the another end side. Therefore, the advancing direction of the cutting and the direction of the water vapor flowing in the flow space are both the direction from the one end side to the another end side. Thus, there is no need to cause a larger amount of the water vapor to flow into the flow space than necessary so as to collect the glass chippings. As a result, the glass chippings can securely be collected without any failure.

In the above-mentioned method, it is preferred that the mother glass sheet be set in a vertical posture, and that the one end side of the flow space be set to an upper side, and the another end side of the flow space be set to a lower side.

With this configuration, the glass chippings are prevented from falling onto the surface of the mother glass sheet by gravity. As a result, it is possible to more effectively avoid the adhesion of the glass chippings onto the surface of the mother glass sheet.

In the above-mentioned method, it is preferred that the method further comprise causing the water vapor to pass through a tubular member having a bellows structure, in which large diameter portions and small diameter portions are alternately connected to each other, to thereby cause the water vapor to flow into the flow space from the upper side of the flow space.

With this configuration, water droplets generated due to condensation of the water vapor are retained by the large diameter portions of the tubular member having the bellows structure. Thus, the risk of the water droplets flowing into the flow space to soil the surface of the mother glass sheet is minimized.

Further, according to one embodiment of the present invention, which is devised to solve the above-mentioned problems, there is provided an apparatus for manufacturing a glass sheet, the apparatus comprising a cutting member for cutting a mother glass sheet having a rectangular shape along a scribe as a boundary, the scribe being formed on a periphery of an edge portion of the mother glass sheet in parallel to the edge portion in a region other than both end portions of the mother glass sheet in a direction along the edge portion, the apparatus being configured to generate, when cutting the mother glass sheet, a maximum stress at a corner portion of the mother glass sheet in a region on an inner side of an imaginary extension straight line connected to the scribe.

According to this configuration, it is possible to attain similar actions and effects to those already described in the above-mentioned method of manufacturing a glass sheet.

Further, according to one embodiment of the present invention, which is devised to solve the above-mentioned problems, there is provided a glass sheet having a substantially rectangular shape, the glass sheet comprising a convexly curved corner portion, the convexly curved corner portion having an untrimmed mirror-smooth end surface. The "untrimmed mirror-smooth surface" herein refers to a surface already finished into a mirror-smooth surface at the time of cutting the glass sheet without polishing or the like.

According to this configuration, the convexly curved corner portion has the untrimmed mirror-smooth end surface, and hence, it is possible to minimize such a situation that, when the glass sheet is to be conveyed in the same step or between the steps, a defect and damage are generated in the corner portion due to contact with a jig or the like that is arranged on the periphery of a conveyance path. In addition, the corner portion, in which defects are liable to be generated to cause cracking during the manufacturing, has the mirror-smooth surface with no defects such as chippings due to the scribe. Thus, damage originating from the corner portion of the glass sheet can also be suppressed effectively in the steps subsequent to the cutting. Further, it is possible to suitably avoid such a situation that, even when the glass sheet is placed on a protective sheet, the corner portion sticks into or snags on the protective sheet. Further, the corner portion of the glass sheet is already finished into a mirror-smooth surface at the time of cutting the glass sheet, and hence there is no need to carry out polishing or the like for the corner portion as an additional process. Therefore, the glass sheet can be manufactured rapidly and easily. In addition, the corner portion is cut without forming the scribe, and hence the generation of glass powders is minimized. As a result, any problem with the glass sheet due to the glass powders can be reduced, and the yield can be enhanced.

In the above-mentioned configuration, it is preferred that an end surface of the glass sheet in a region other than the corner portion comprise a region formed of a scribe mark present on one side in a thickness direction, and an untrimmed mirror-smooth surface present on another side in the thickness direction.

In this glass sheet, the end surface in the region other than the corner portion comprises a region formed by the cutting along the scribe. Therefore, the formation of this region and therefore the manufacture of the glass sheet can be carried out further rapidly and easily.

Advantageous Effects of Invention

As described above, according to one embodiment of the present invention, it is possible to prevent, when manufacturing the glass sheet, a defect and damage in the corner portion of the glass sheet and avoid such a situation that the corner portion sticks into or snags on the protective sheet. Thus, the yield of the product can be enhanced.

DESCRIPTION OF EMBODIMENTS

Now, embodiments of the present invention are described with reference to the accompanying drawings. Note that, in the following embodiments, description is given by taking as an example a case where both edge portions of a glass sheet in a vertical posture, which are parallel to an up-and-down direction, are to be cut along a scribe as a boundary.

Figure 1:
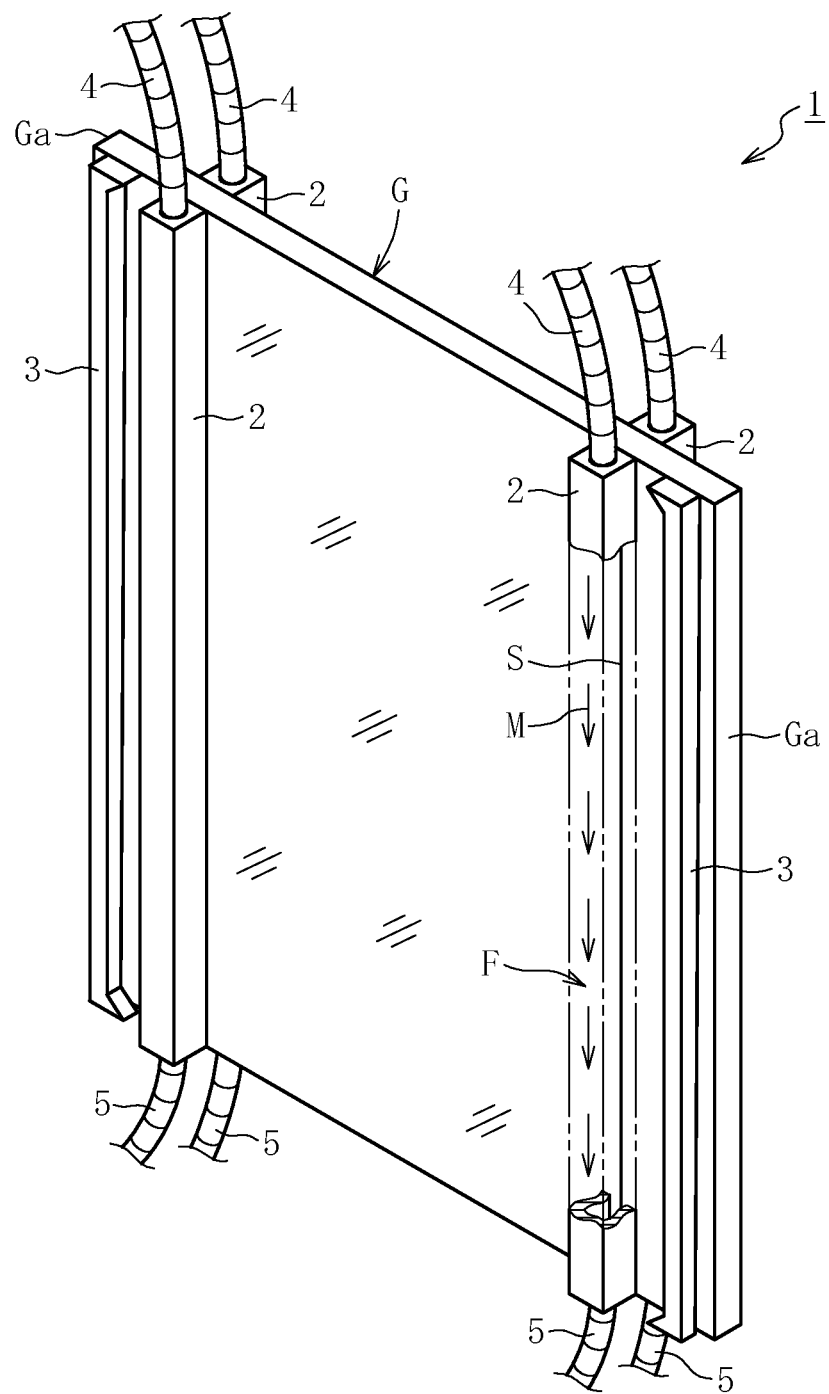
FIG. 1 is a perspective view illustrating an apparatus for manufacturing a glass sheet according to an embodiment of the present invention.

FIG. 1 is a perspective view illustrating an apparatus for manufacturing a glass sheet according to an embodiment of the present invention. As illustrated in FIG. 1, an apparatus 1 for manufacturing a glass sheet comprises, as main components thereof, covering members 2 for covering scribes S formed in a surface of a glass sheet G serving as a mother glass sheet in a vertical posture so as to form flow spaces F of water vapor M, supply hoses 4 each serving as a tubular member for causing the water vapor M to flow into the flow space F, discharge hoses 5 for causing the water vapor M to flow out of the flow space F, and cutting bars 3 each serving as a cutting member for pressing a region on the periphery of an edge portion Ga of the glass sheet G so as to apply a bending moment to the region in the vicinity of the scribe S. Note that, the glass sheet G to be cut is suspended by a gripping member (for example, a chuck) (not shown).

Figure 2:
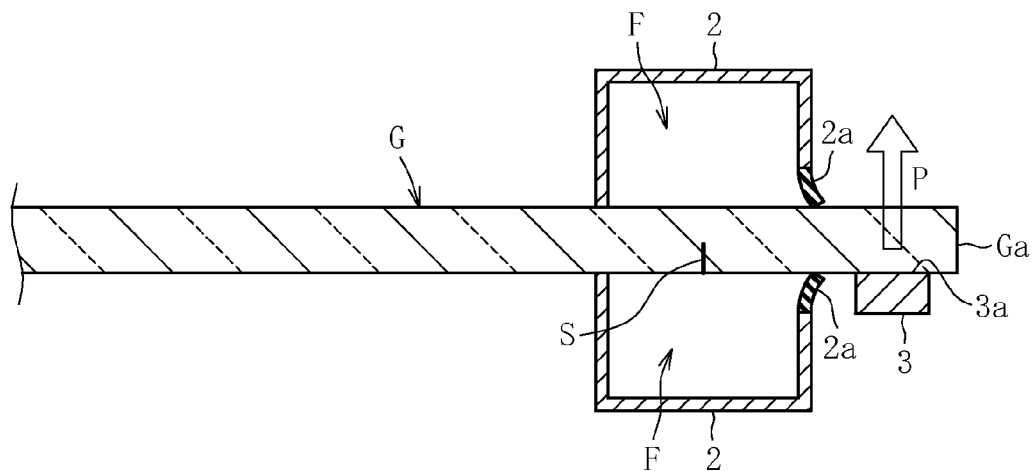
FIG. 2 is a sectional view illustrating a covering member provided in the apparatus for manufacturing a glass sheet.

There are arranged two sets of the covering members 2, each of which is constituted by a pair of the covering members 2 that sandwiches the glass sheet G in its thickness direction. The two sets of the covering members 2 are configured to cover the two scribes S formed in parallel to the edge portions Ga of the glass sheet G, which are parallel to the up-and-down direction, from a front surface side and a back surface side of the glass sheet G over the entire length of each of the scribes S. Further, each of the covering members 2 has a "C" shape in horizontal cross section as illustrated in FIG. 2, and forms the flow space F of the water vapor M, which is surrounded by the covering member 2 and corresponding one of the front surface and the back surface of the glass sheet G. Still further, out of two abutment portions of the covering member 2, which abut against corresponding one of the front surface and the back surface of the glass sheet G, at the abutment portion on the edge portion Ga side, the covering member 2 comprises a rubber 2a. When the glass sheet G is to be pressed in the direction P of FIG. 2 through use of the cutting bar 3 described later, the rubber 2a is elastically deformed in conformity with deformation of the glass sheet G, to thereby seal the flow space F constantly. In addition, openings are formed at both end portions of the covering member 2 in the up-and-down direction, respectively. The upper opening serves as an inflow port for causing the water vapor M to flow into the flow space F, and the lower opening serves as an outflow port for causing the water vapor M to flow out of the flow space F.

Each of the supply hose 4 connected to the inflow port formed in the covering member 2 and the discharge hose 5 connected to the outflow port formed in the covering member 2 has a so-called bellows structure, in which large diameter portions larger in inner diameter and small diameter portions smaller in inner diameter are alternately connected to each other. The supply hose 4 is connected to a supply device for water vapor (for example, a humidifier)

(not shown). The water vapor M generated by the supply device passes through the supply hose 4 and flows into the flow space F. The discharge hose 5 is connected to a suction device (for example, a vacuum pump) (not shown). Through suction carried out by the suction device, a negative pressure is applied into the discharge hose 5, and thus the water vapor M flows out of the flow space F.

With the above-mentioned configuration, the water vapor M generated by the supply device for water vapor passes through the supply hose 4 and flows into the flow space F through the inflow port. Then, the water vapor M flows from the upper side to the lower side along the scribe S formed in the glass sheet G. After that, the water vapor M is discharged out of the flow space F through the outflow port, and passes through the discharge hose 5 to reach the suction device.

Figure 3A:
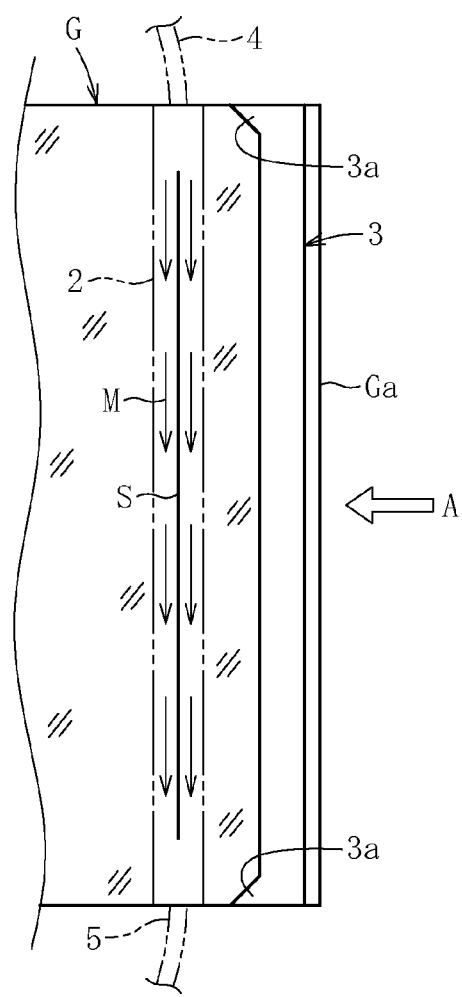
FIG. 3a is a front view illustrating a cutting bar provided in the apparatus for manufacturing a glass sheet.
Figure 3B:
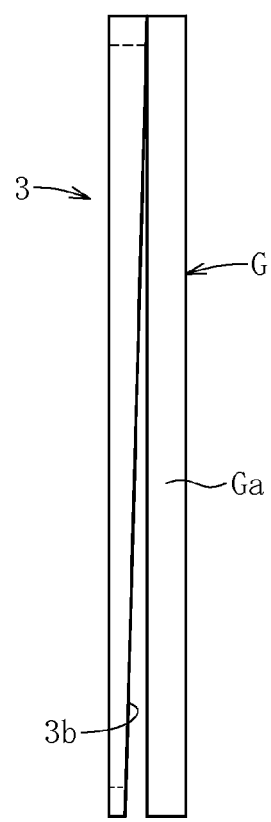
FIG. 3b is a side view illustrating the cutting bar provided in the apparatus for manufacturing a glass sheet.

As illustrated in FIG. 3a, the cutting bar 3 is arranged in parallel to the edge portion Ga of the glass sheet G. At both distal end portions of the cutting bar 3 in the up-and-down direction, the cutting bar 3 comprises protruding portions 3a, which gradually protrude from the edge portion Ga side of the glass sheet G to the inner side thereof as being shifted toward the distal end side. Further, as illustrated in FIG. 3b, which is a side view of the cutting bar 3 as seen in the direction A of FIG. 3a, in a pressing portion 3b for pressing the surface of the glass sheet G, the entire region in the up-and-down direction is inclined gradually away from the surface of the glass sheet G as being shifted from the upper side toward the lower side. Thus, when the cutting bar 3 presses the glass sheet G, the pressing portion 3b is configured to sequentially abut against the surface of the glass sheet G in a region from the upper side to the lower side, to thereby press the glass sheet G. In this case, it is preferred that the inclination angle of the pressing portion 3b with respect to the vertical line be 0.1° to 5°.

Now, referring to the accompanying drawings, description is given of a method of manufacturing a glass sheet using the above-mentioned apparatus 1 for manufacturing a glass sheet. Note that, in the drawings for illustrating the method of manufacturing a glass sheet, the illustrations of the covering member 2, the supply hose 4, the discharge hose 5, and the flow space F are omitted.

Figure 4A:
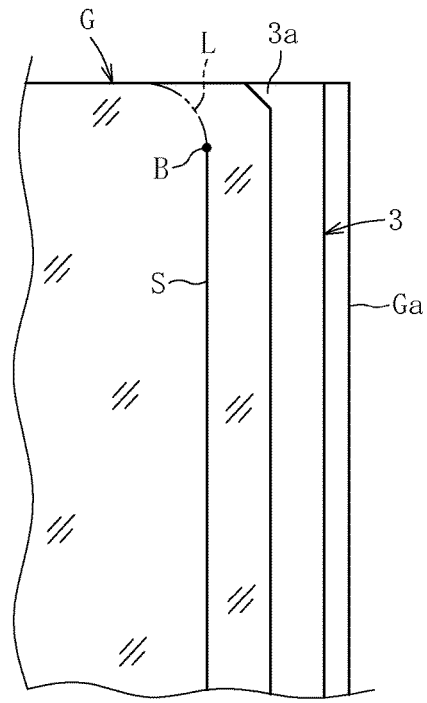
FIG. 4a is a front view illustrating a practical situation of a method of manufacturing a glass sheet according to the embodiment of the present invention.

Firstly, as illustrated in FIG. 4a, the scribe S is formed in the surface of the glass sheet G from the starting point B of FIG. 4a through pressing with a wheel cutter, irradiation with a laser, or the like. The scribe S is formed in parallel to the edge portion Ga in a region other than both end portions of the glass sheet G in the up-and-down direction. Note that, it is preferred that the separation distance of the point B from the edge portion Ga be about 3 mm to 50 mm. When the separation distance is less than 3 mm, as described later, it becomes difficult to form a corner portion Gb into a convexly curved shape. Further, at the time of conveying the glass sheet G, due to vibrations or the like, the glass sheet G is liable to be broken along the scribe S as a boundary before the glass sheet G is cut by the cutting bar 3. When the separation distance is more than 50 mm, on the other hand, it is not practical to form the corner portion into the convexly curved shape.

Figure 4B:
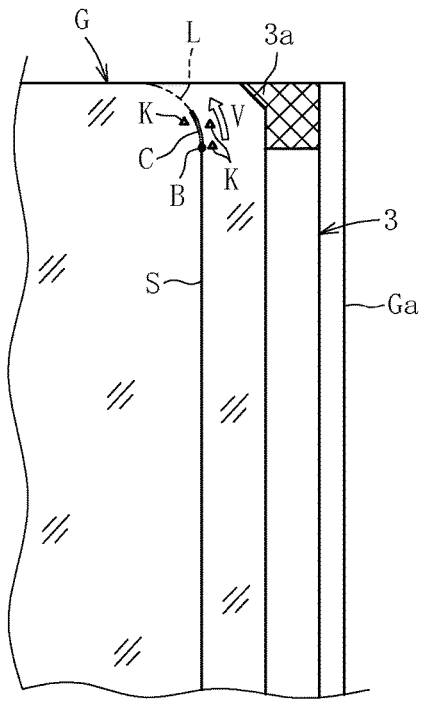
FIG. 4b is a front view illustrating the practical situation of the method of manufacturing a glass sheet according to the embodiment of the present invention.

When the formation of the scribe S is completed, the scribe S is then covered with the covering member 2 (not shown) over the entire length of the scribe S. After that, as illustrated in FIG. 4b, the cutting bar 3 is used to sequentially press the surface of the glass sheet G in the region from the upper side to the lower side (the direction of application of a pressing force is a direction from the near side to the far side of the drawing sheet of FIG. 4b). In the cutting bar 3 illustrated in FIG. 4b, the cross-hatching region herein indicates that the glass sheet G is pressed in this region (the same applies to the figures to be referred to later).

When the glass sheet G starts to be pressed by the cutting bar 3, the water vapor M is caused to flow into the flow space F through the supply hose 4. In this case, the supply hose 4 has the bellows structure, and hence, even when water droplets are generated inside the supply hose 4 due to condensation of the water vapor M, the water droplets are retained by the large diameter portions of the bellows structure. Thus, the water droplets are prevented from flowing into the flow space F. As a result, it is possible to minimize a risk in that the water droplets soil the surface of the glass sheet G.

When a region in the vicinity of the upper end portion of the glass sheet G is pressed by the cutting bar 3, as indicated by the two-dot chain line in FIG. 4b, a bending portion L, in which the glass sheet G is bent locally, is formed in the glass sheet G by the bending moment generated due to the pressing force. The bending portion L conforms to the shape of the protruding portion 3a formed on the cutting bar 3, and gradually protrudes from the edge portion Ga side to the inner side as being shifted toward the upper distal end of the glass sheet Gin the up-and-down direction. Further, the bending portion L is continuously formed in a state of being connected to the scribe S at the point B. At this time, a tensile stress higher than that in a region on the periphery of the bending portion L is applied to the bending portion L, and the maximum stress is generated in this bending portion L. Therefore, in this region, the glass sheet G is not cut along the scribe S, but is cut along the bending portion L connected to the scribe S, and hence a cleaved portion C is sequentially formed in the direction V of FIG. 4b. Further, glass chippings K including small glass pieces and glass powders are generated at the cleaved portion C. The glass chippings K are borne in a direction from the upper side to the lower side by the water vapor M flowing in the flow space F.

Figure 4C:
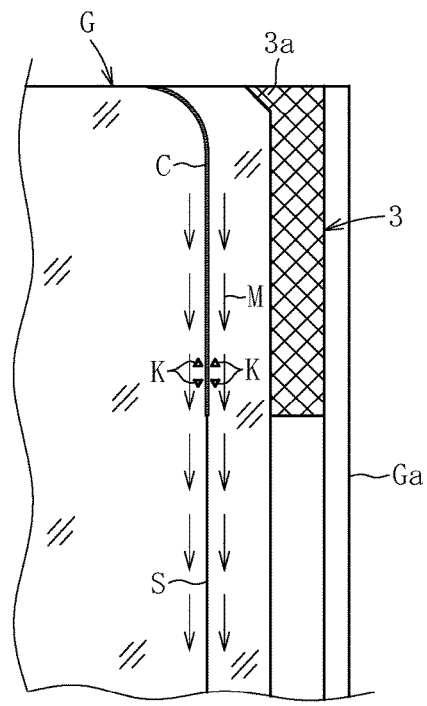
FIG. 4c is a front view illustrating the practical situation of the method of manufacturing a glass sheet according to the embodiment of the present invention.

After that, as illustrated in FIG. 4c, the pressing of the glass sheet G by the cutting bar 3 is further advanced toward the lower side. Then, the bending moment is sequentially generated in the region in the vicinity of the scribe S formed in the surface of the glass sheet Gin a direction from the upper side to the lower side. Thus, the glass sheet G is sequentially cut along the scribe S as a boundary in a direction from the upper side to the lower side. Also at this time, similarly to the above-mentioned case, the glass chippings K are generated at the cleaved portion C.

When the cutting of the glass sheet G is advanced, due to the water vapor M flowing in the flow space F, the region on the periphery of the scribe S is brought into a humidified state as compared to a case where air is caused to flow simply. In addition, it is found that, under the humidified state, the pressing force necessary to cut the glass sheet G may be smaller. Therefore, it is possible to reduce the amount of the glass chippings K that may be generated at the cleaved portion C at the time of cutting the glass sheet G.

Further, the advancing direction of the cutting and the direction of the water vapor M flowing in the flow space F are both the direction from the upper side to the lower side. Therefore, there is no need to cause a larger amount of the water vapor M to flow into the flow space F than necessary so as to collect the glass chippings K. Further, the water vapor M and the glass chippings K are borne in the direction from the upper side to the lower side without resisting the gravity. Accordingly, the glass chippings K can securely be collected without any failure.

In addition, the glass sheet G is set in the vertical posture, and hence it is also possible to avoid such a situation that the glass chippings K fall by gravity and adhere onto the surface of the glass sheet G. Further, the inside of the flow space F is humidified, and hence static electricity is not liable to charge the glass chippings K. As a result, the effect of preventing the adhesion of the glass chippings K onto the glass sheet G can further be enhanced.

Figure 4D:
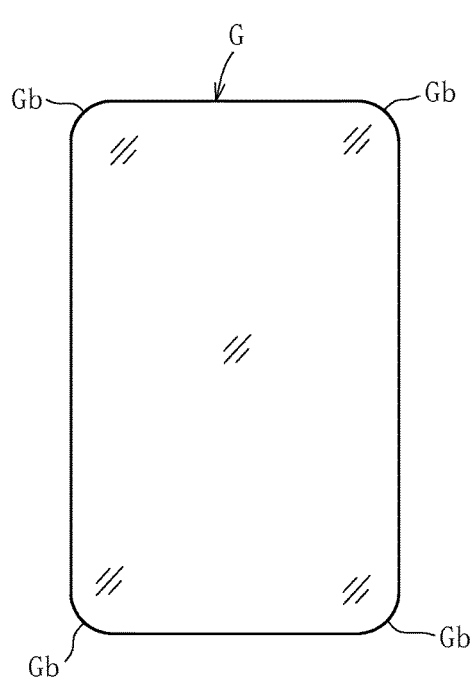
FIG. 4d is a front view illustrating the practical situation of the method of manufacturing a glass sheet according to the embodiment of the present invention.

When the cutting of the glass sheet G is further advanced and a region in the vicinity of the lower end portion of the glass sheet G is pressed by the cutting bar 3, the glass sheet G is then cut in a similar manner to that at the time when the above-mentioned region in the vicinity of the upper end portion is pressed. Thus, the edge portion Ga of the glass sheet G is completely cleaved as illustrated in FIG. 4d. Further, the glass chippings K borne by the water vapor M in the direction from the upper side to the lower side are further borne out of the flow space F through the discharge hose 5 together with the water vapor M. In this manner, the glass chippings K are collected. When those operations are completed, the inflow of the water vapor M into the flow space F is stopped.

The glass sheet G thus manufactured has its corner portion Gb formed into the convexly curved shape, and the end surface of the corner portion Gb is an untrimmed mirror-smooth surface, which is already finished into a mirror-smooth surface at the time of cutting the glass sheet G without polishing or the like. Note that, in a region other than the corner portion Gb, the end surface extending in the up-and-down direction in FIG. 4d has a scribe mark present on one side in the thickness direction (surface side in which the scribe S is formed), and an untrimmed mirror-smooth surface present on another side in the thickness direction.

To obtain such a mirror-smooth surface in the related art, it is necessary to grind and polish the corner portion of the glass sheet through use of a grinding wheel or the like, resulting in a drawback in that the manufacturing efficiency is liable to deteriorate. With the method of manufacturing a glass sheet according to this embodiment, however, as compared to the above-mentioned processes, it is only necessary to carry out the cutting, which is greatly advantageous from the viewpoint of the manufacturing efficiency. Along with the cutting, the corner portion Gb having a mirror-smooth surface can be obtained. Therefore, the glass sheet G can be manufactured rapidly and easily. Further, the corner portion Gb is cut without forming the scribe, and hence the generation of glass powders is minimized. As a result, any problem with the glass sheet G due to the glass powders can be reduced, and the yield can be enhanced. In addition, the corner portion Gb, in which defects are liable to be generated to cause cracking during the manufacturing, has the mirror-smooth surface with no defects such as chippings due to the scribe. Thus, damage originating from the corner portion Gb of the glass sheet G can also be suppressed effectively in the steps subsequent to the cutting.

Further, when the glass sheet G in the course of manufacturing is to be moved in the same step or between the steps, in order to prevent a flaw and a crack from being generated in the glass sheet G, the glass sheet G may be placed on a protective sheet. In this case, in the glass sheet manufactured by the related-art manufacturing method, the corner portion of the glass sheet is formed into an angulated sharp shape, and hence the corner portion may stick into or snag on the protective sheet, resulting in such a problem that the protective sheet is damaged. In the glass sheet G manufactured by the above-mentioned method of manufacturing a glass sheet, however, such a problem can be minimized. Note that, in this embodiment, both the upper and lower corner portions Gb of the glass sheet G are formed into the convexly curved shape. In a case where the glass sheet G is to be conveyed after the edge portions Ga on both sides are cleaved, however, only one of the upper and lower corner portions Gb, which is on a forward side in a conveyance direction of the glass sheet G after the cleaving, may be formed into the convexly curved shape.

The configuration of the apparatus for manufacturing a glass sheet according to the present invention is not limited to the configuration described in the above-mentioned embodiment. For example, in the configuration described in the above-mentioned embodiment, the water vapor is caused to flow in the direction from the upper side to the lower side, but may be caused to flow in a direction from the lower side to the upper side. In this case, it is preferred that the inclination direction of the pressing portion of the cutting bar be reversed from that of the above-mentioned embodiment between the upper side and the lower side, and that the advancing direction of the cutting be set to the direction from the lower side to the upper side. In addition, the water vapor may be caused to flow in a horizontal direction or an oblique direction.

Figure 5:
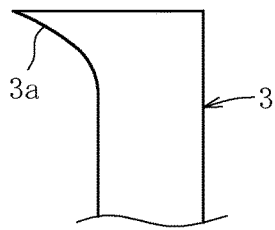
FIG. 5 is a front view illustrating another cutting bar provided in the apparatus for manufacturing a glass sheet.
Figure 6A:
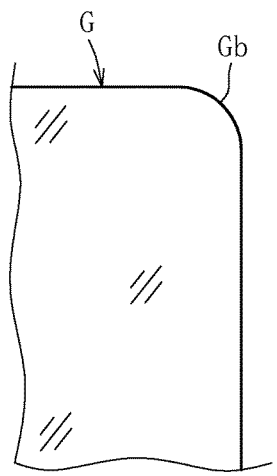
FIG. 6a is a front view illustrating a corner portion of the glass sheet according to the embodiment of the present invention.
Figure 6B:
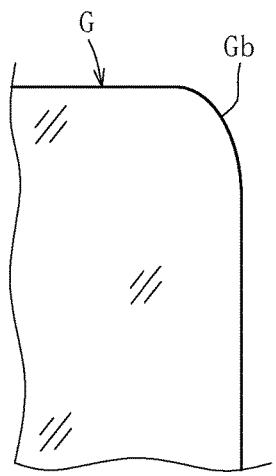
FIG. 6b is a front view illustrating another corner portion of the glass sheet according to the embodiment of the present invention.
Figure 6C:
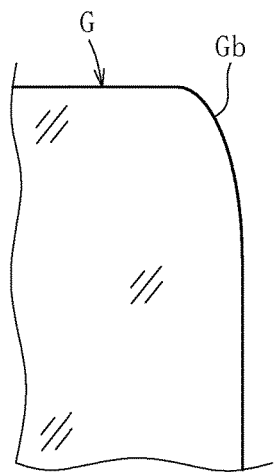
FIG. 6c is a front view illustrating another corner portion of the glass sheet according to the embodiment of the present invention.
Figure 6D:
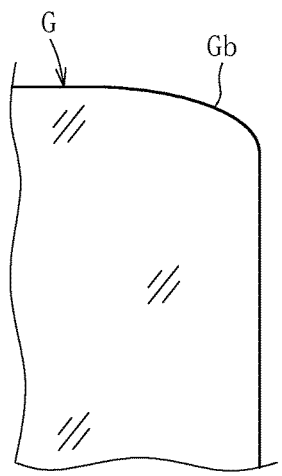
FIG. 6d is a front view illustrating another corner portion of the glass sheet according to the embodiment of the present invention.
Figure 6E:
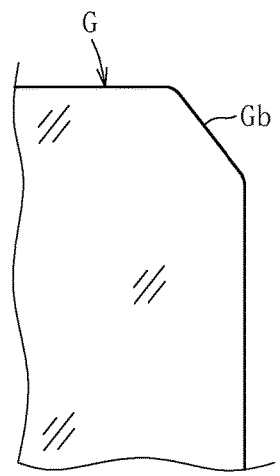
FIG. 6e is a front view illustrating another corner portion of the glass sheet according to the embodiment of the present invention.
Figure 7:
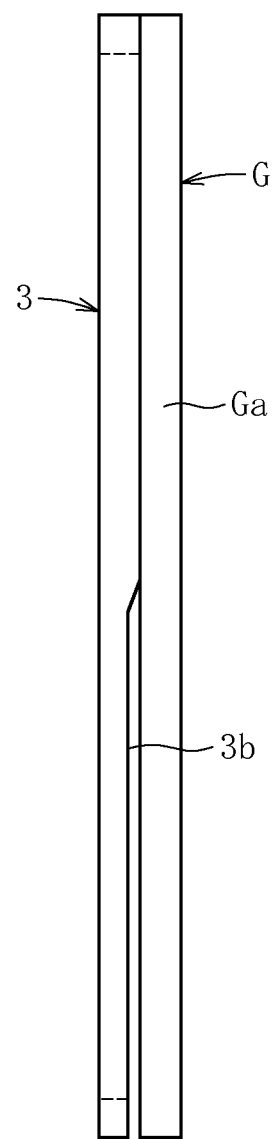
FIG. 7 is a side view illustrating another cutting bar provided in the apparatus for manufacturing a glass sheet.
Figure 8:
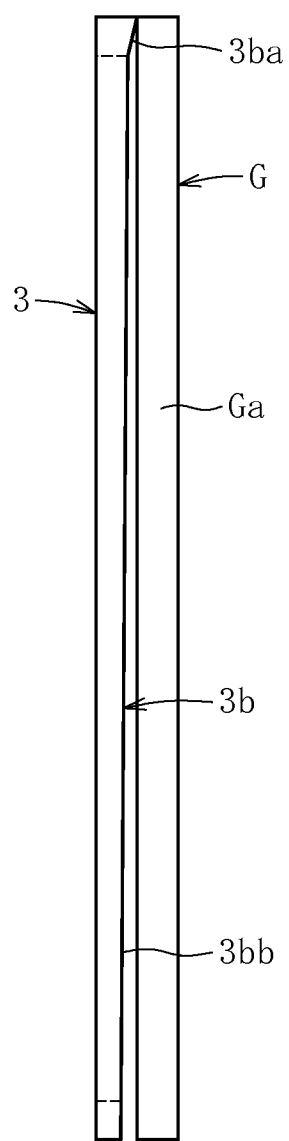
FIG. 8 is a side view illustrating another cutting bar provided in the apparatus for manufacturing a glass sheet.
Figure 9:
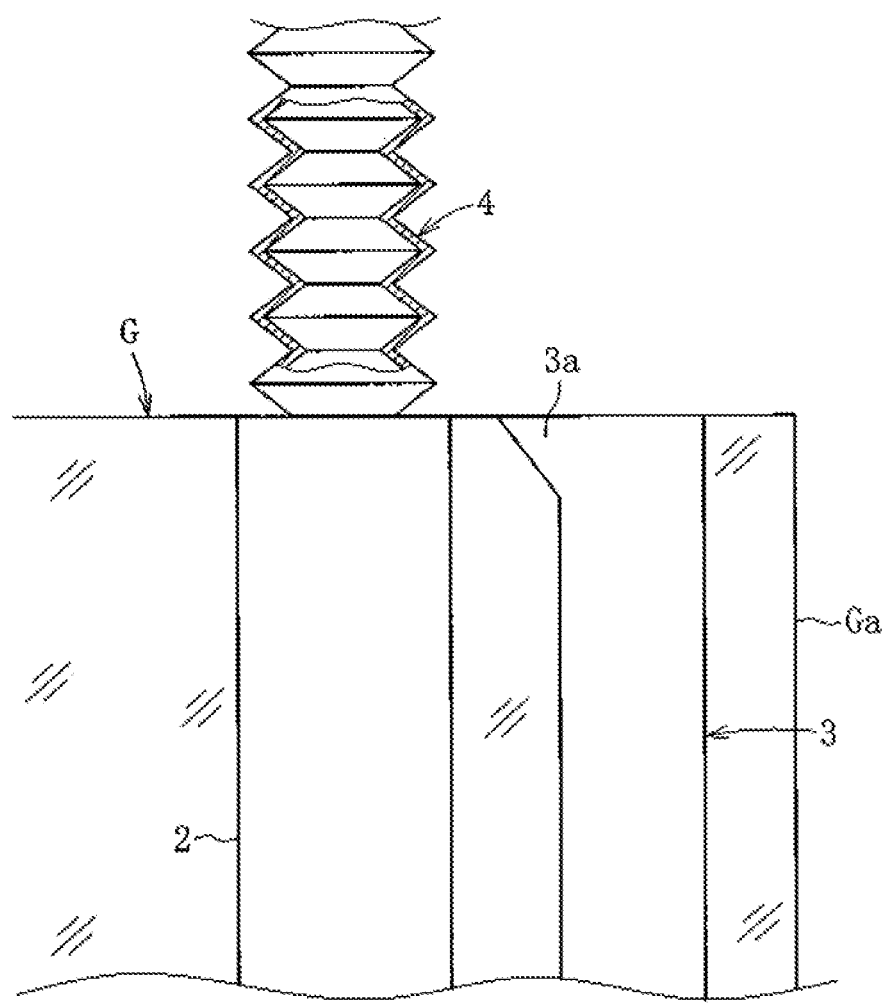
FIG. 9 is a front view illustrating an apparatus for manufacturing a glass sheet according to an embodiment of the present invention.

Further, there is no need to form the cutting bar into the same shape as that of the above-mentioned embodiment. For example, the shape of the protruding portion formed on the cutting bar may be a curved shape as illustrated in FIG. 5. Through the appropriate change of the shape of the protruding portion as described above, the corner portion Gb of the glass sheet G can be formed into various shapes as illustrated in FIGS. 6a to 6e. Note that, even in the case of the glass sheet G having any one of the corner portions Gb as illustrated in FIGS. 6a to 6e, the effects already described in the above-mentioned embodiment can be obtained similarly. Further, in the above-mentioned embodiment, the pressing portion of the cutting bar has such a shape that the entire region in the up-and-down direction is inclined, but as illustrated in FIG. 7, the pressing portion may have such a shape that a part of the pressing portion in the up-and-down direction is inclined. Still further, as illustrated in FIG. 8, the pressing portion 3b may have such a shape that the gradient is set at two levels. In this case, the ratio of a first gradient portion 3ba of the pressing portion 3b is set to 10% or less of the length of the cutting bar 3, and the inclination angle of the first gradient portion 3ba with respect to the vertical line is set to 3° to 10°, whereas the inclination angle of a second gradient portion 3bb connected to the first gradient portion 3ba is set to 0.1° to 5°. With those settings, the cutting can be carried out more easily.

Further, the timing to cause the water vapor to flow into the flow space is not limited to that of the above-mentioned embodiment. The water vapor may be caused to flow into the flow space before the cutting bar presses the glass sheet, or alternatively, the water vapor may be caused to flow into the flow space constantly irrespective of the status of advance of the cutting.

In addition, in the above-mentioned embodiment, the description is given by taking as an example the case where both the edge portions of the glass sheet in the vertical posture, which are parallel to the up-and-down direction, are to be cut along the scribe as a boundary, but the present invention is not limited thereto. For example, edge portions of a glass sheet in a horizontal posture may be cut, or alternatively, edge portions of a glass sheet in a posture inclined with respect to a horizontal plane may be cut.

REFERENCE SIGNS LIST 1 apparatus for manufacturing glass sheet
2 covering member 2a rubber
3 cutting bar
3a protruding portion
3b pressing portion
3ba first gradient portion
3bb second gradient portion
4 supply hose
5 discharge hose
G glass sheet
Ga edge portion of glass sheet
Gb corner portion of glass sheet
S scribe
B starting point of scribe
L bending portion
M water vapor
F flow space of water vapor
C cleaved portion
K glass chipping

The invention claimed is:

1. A method of manufacturing a glass sheet, which involves forming a scribe in one surface of a mother glass sheet having a rectangular shape on a periphery of an edge portion of the mother glass sheet in parallel to the edge portion, and cutting the mother glass sheet along the scribe as a boundary in order to cut out the glass sheet from the mother glass sheet, the method comprising:
    forming the scribe in a region other than both end portions of the mother glass sheet in a direction along the edge portion; and
    cutting the mother glass sheet along a bending portion in which the mother glass sheet is bent at a portion thereof,
    the bending portion being continuously formed in a state of being connected to the scribe and being formed so as to separate from the edge portion as being shifted away from the scribe along the direction along the edge portion.

2. The method of manufacturing a glass sheet according to claim 1,
    wherein a cutting member for cutting the mother glass sheet comprises a pressing portion extending in the direction along the edge portion and being configured to press the one surface of the mother glass sheet, the pressing portion comprising protruding portions, each of the protruding portions protruding from an edge portion of the cutting member to one of distal end sides of the cutting member as being shifted toward the one of the distal end sides of the cutting member and being formed at one of distal end portions of the pressing portion in the direction along the edge portion, and
    wherein the method further comprises pressing a region on an edge portion side of the mother glass sheet with respect to the scribe by the pressing portion of the cutting member.

3. The method of manufacturing a glass sheet according to claim 1, further comprising:
    covering the scribe with a covering member over an entire length of the scribe so as to form a flow space of water vapor;
    causing the water vapor to flow into the flow space from one end side of the flow space in a direction along the scribe; and
    collecting glass chippings, which are generated through the cutting, by the water vapor flowing out of the flow space from another end side of the flow space in the direction along the scribe.

4. The method of manufacturing a glass sheet according to claim 3,
    wherein a cutting member for cutting the mother glass sheet comprises a pressing portion extending in the direction along the edge portion and being configured to press the one surface of the mother glass sheet,
    wherein the pressing portion of the cutting member comprises an inclined portion spaced away from the one surface of the mother glass sheet as being shifted from one end side of the pressing portion to another end side of the pressing portion in the direction along the edge portion, and
    wherein the method further comprises sequentially pressing, in a direction from the one end side of the pressing portion to the other end side of the pressing portion, a region on an edge portion side of the mother glass sheet with respect to the scribe by the pressing portion of the cutting member.

5. The method of manufacturing a glass sheet according to claim 3,
    wherein the mother glass sheet is set in a vertical posture, and
    wherein the one end side of the flow space is set to an upper side, and the other end side of the flow space is set to a lower side.

6. The method of manufacturing a glass sheet according to claim 5, further comprising causing the water vapor to pass through a tubular member having a bellows structure, in which large diameter portions and small diameter portions are alternately connected to each other, to thereby cause the water vapor to flow into the flow space from the upper side of the flow space.

* * * * *